United States Patent
Komatsu (10) Patent No.: US 10,323,738 B2
(45) Date of Patent: Jun. 18, 2019

(54) MULTIPLE MATERIAL SOLENOID ACTUATOR PLUNGER

(71) Applicant: GKN Automotive Limited, Worcestershire (GB)

(72) Inventor: Toshiaki Komatsu, West Bloomfield, MI (US)

(73) Assignee: GKN Automotive Limited, Worcestershire (GB)

( * ) Notice: Subject to any disclaimer, the term of this patent is extended or adjusted under 35 U.S.C. 154(b) by 122 days.

(21) Appl. No.: 15/496,574

(22) Filed: Apr. 25, 2017

(65) Prior Publication Data

US 2018/0306297 A1    Oct. 25, 2018

(51) Int. Cl.
| | | |
|---|---|---|
| F16H 48/24 | (2006.01) | |
| F16H 48/34 | (2012.01) | |
| B22D 19/04 | (2006.01) | |
| B22D 25/02 | (2006.01) | |
| F16H 48/08 | (2006.01) | |

(52) U.S. Cl.
CPC ............. *F16H 48/34* (2013.01); *B22D 19/04* (2013.01); *B22D 25/02* (2013.01); *F16H 48/24* (2013.01); *F16H 48/08* (2013.01); *F16H 2048/346* (2013.01)

(58) Field of Classification Search
CPC .......... F16H 48/06; F16H 48/24; F16H 48/34; F16D 11/08; F16D 11/14; F16D 27/14; B60K 23/04; B60K 2023/0858
See application file for complete search history.

(56) References Cited

U.S. PATENT DOCUMENTS

| | | |
|---|---|---|
| 2007/0054771 A1 | 3/2007 | Fusegi |
| 2007/0179008 A1 | 8/2007 | Fusegi et al. |
| 2017/0254399 A1* | 9/2017 | Onitake ................. F16D 27/09 |

FOREIGN PATENT DOCUMENTS

| | | | |
|---|---|---|---|
| WO | WO2016035129 A1 | 3/2016 | |
| WO | WO-2016/035129 A1 * | 10/2016 | ............. F16H 48/34 |

OTHER PUBLICATIONS

Written Opinion & International Search Report for PCT Application No. PCT/US2018/028075 dated Jul. 31, 2018 (11 pages).

* cited by examiner

*Primary Examiner* — Mark J Beauchaine
(74) *Attorney, Agent, or Firm* — Jennifer M. Brumbaugh; Reising Ethington P.C.

(57) ABSTRACT

In at least some implementations, a system for a vehicle differential that has multiple gears may include a coil, a drive member movable in response to a magnetic field generated by application of electricity to the coil and a lock member driven by the drive member to selectively engage a gear of the differential. The drive member is movable between a first position and a second position, has an axis and includes a first body formed at least partially from a first material that is magnetically responsive and a second body formed at least partially from a second material. The first body and second body are coupled together and overlapped in two opposing axial directions to limit or prevent relative axial movement between the first body and the second body.

21 Claims, 5 Drawing Sheets

MULTIPLE MATERIAL SOLENOID ACTUATOR PLUNGER

TECHNICAL FIELD

The present disclosure relates generally to a plunger made from multiple materials and which may be used in an electrically controlled vehicle differential locking device.

BACKGROUND

During normal operation of a motor vehicle, it is common that all four wheels might not be turning at an identical rate of speed. Different wheel turn rates are most commonly encountered when the vehicle is making a turn, but may also be caused by braking or non-uniform road surface conditions. In order to accommodate differing wheel turning rates while continuing to direct power to two wheels it is possible to provide a differential that allows for different wheel turn rates between the powered wheels. The differential allows the wheels to spin at different rates while delivering power to each wheel. While this solution may be satisfactory in some driving conditions, it is unsatisfactory under conditions where one of the powered wheels experiences a surface having a much lower coefficient of friction than a surface engaged by the other wheel(s). Such conditions may prevent the application of torque to a wheel with more traction, thereby resulting in undesired vehicle performance. A locking mechanism may be provided to lock the differential and prevent different wheel spin rates between two wheels in at least some circumstances.

SUMMARY

In at least some implementations, a system for a vehicle differential that has multiple gears may include a coil, a drive member movable in response to a magnetic field generated by application of electricity to the coil and a lock member driven by the drive member to selectively engage a gear of the differential. The drive member is movable between a first position and a second position, has an axis and includes a first body formed at least partially from a first material that is magnetically responsive and a second body formed at least partially from a second material. The first body and second body are coupled together and overlapped in two opposing axial directions to limit or prevent relative axial movement between the first body and the second body.

In at least some implementations, a drive member for a vehicle differential locking mechanism that is movable in response to a magnetic field, has an axis and includes a first body formed at least partially from a first material that is magnetically responsive and a second body formed at least partially from a second material. The first body and second body are coupled together and overlapped in two opposing axial directions to limit or prevent relative axial movement between the first body and the second body.

In at least some implementations, a drive member for a vehicle differential locking mechanism that is movable in response to a magnetic field may be formed by a method that includes:
putting into a mold a first body formed at least partially of a magnetically responsive material;
providing flowable material into the mold; and
allowing or causing the flowable material to harden to a solid state defining a second body integrally coupled to the first body, wherein the first body and second body are overlapped in two opposing axial directions to limit or prevent relative axial movement between the first body and the second body.

BRIEF DESCRIPTION OF THE DRAWINGS

The following detailed description of preferred implementations and best mode will be set forth with regard to the accompanying drawings, in which.

DETAILED DESCRIPTION

Figure 1:
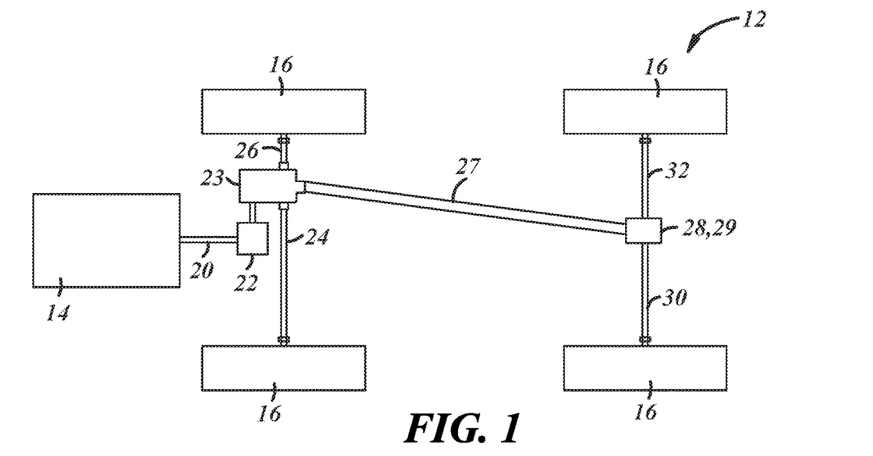
FIG. 1 is a schematic diagram of a vehicle driveline assembly.

Referring in more detail to the drawings, FIG. 1 illustrates a vehicle driveline 12 that provides power from an engine 14 to multiple wheels 16. The engine 14 supplies torque to an input shaft 20 which is coupled to the rest of the driveline 12 via a spool 22, power transfer unit or similar device. The spool 22 or other device may have an output coupled to a front drive unit 23 which may include a differential assembly. A first side shaft 24 and a second side shaft 26 are coupled to the drive unit/differential 23 which permits relative rotation between the side shafts 24, 26. A prop shaft 27 may extend between the front drive unit 23 and a rear drive unit 28 that may include a differential assembly 29 that is coupled to rear side shafts 30, 32.

Figure 2:
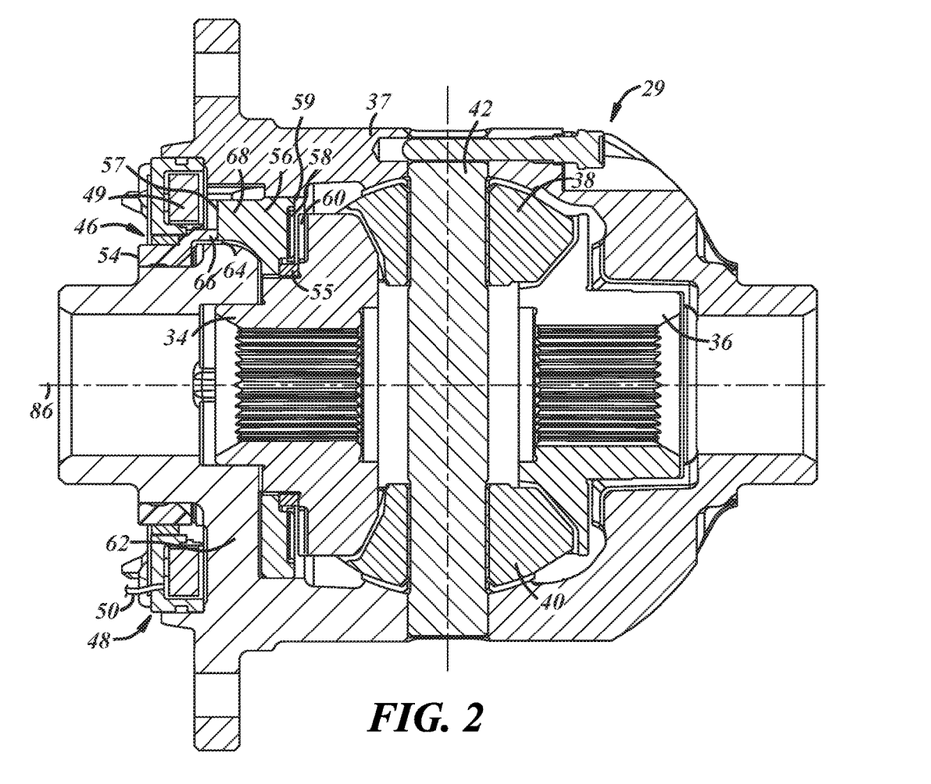
FIG. 2 is a cross-sectional view of a differential with an electrically actuated locking mechanism, wherein the differential is shown in an open position.

Referring now to FIG. 2, the first rear side shaft 30 is connected to a first side gear 34 within the differential 29. Similarly, the second rear side shaft 32 is connected to a second side gear 36 within the differential 29. The differential 29 includes side gears 34, 36 that are generally carried within a housing 37 of the differential 29 and are rotatably coupled to the side shafts 30, 32, respectively. The differential also includes pinion gears 38, 40 that are meshed with side gears 34, 36, respectively, and which are mounted within the housing 37 on a pinion shaft 42.

To selectively lock and unlock the differential 29 a locking mechanism 46 is provided. The locking mechanism 46 may have actuated and deactuated states, and in one state the locking mechanism couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the locking mechanism 46 is electrically actuated and includes a solenoid 48 having an annular wire coil 49 and a drive member that may include an armature or plunger 54 received at least partially within the coil. In at least some implementations, the plunger 54 is also annular, the plunger and coil 49 are coaxially arranged and carried by the housing 37 for rotation with the housing, and one side shaft (here, the second side shaft 32) extends coaxially through the coil and plunger. Electric power is supplied to the coil 49 via a power wire 50 to generate a magnetic field that displaces the plunger 54 relative to the coil from a first or retracted position to a second or advanced position. To facilitate return of the plunger 54 from the second position back to the first position when power is not provided to the coil 49, a biasing member, such as a spring 55 (FIG. 2) may act on the plunger 54, or on a component engaged with the plunger, as set forth below. In at least some implementations, the locking mechanism 46 is actuated when the plunger 54 is in the second position and the locking mechanism is deactuated when the plunger is in the first position. While in the example shown the plunger 54 is in its second position when power is provided to the coil 49 and the plunger moves to the first position when power is not supplied to the coil, the opposite could be true if desired (e.g. the locking mechanism 46 could be moved to the actuated position by the biasing member 55 and deactuated by powering the coil).

In at least some implementations, the locking mechanism 46 may further include or be associated with a lock member 56 adapted to be driven by the plunger 54 and to interface with the side gear 36 as set forth below. The lock member 56 may be generally annular and a portion of the second side gear 36 and/or shaft 32 may extend through the lock member. The lock member 56 may include a rear face 57 engageable by the plunger 54 and a front face 59 having at least one engagement feature 58, such as gear or clutch teeth (e.g. dog clutch teeth) configured to engage a corresponding engagement feature 60 (e.g. gear or dog clutch teeth) formed on a rear face of the second side gear 36. The spring 55 may act on the lock member 56 to urge the lock member into the plunger 54 and move the plunger to its first position when the coil 49 is not powered, as noted above. In the implementation shown, the plunger 54 is located adjacent to one side of a housing wall 62 and the lock member 56 is located adjacent to the other side of the wall 62. The wall 62 includes voids 64, and the plunger 54 and lock member 56 include axially extending feet 66, 68 (e.g. FIGS. 2 and 3), respectively, that extend into or through the voids 64 in the wall so that the plunger and lock member are engaged with each other across or through the wall. Like the coil 49 and plunger 54, the lock member 56 also is carried by and rotates with the housing 37.

Figure 3:
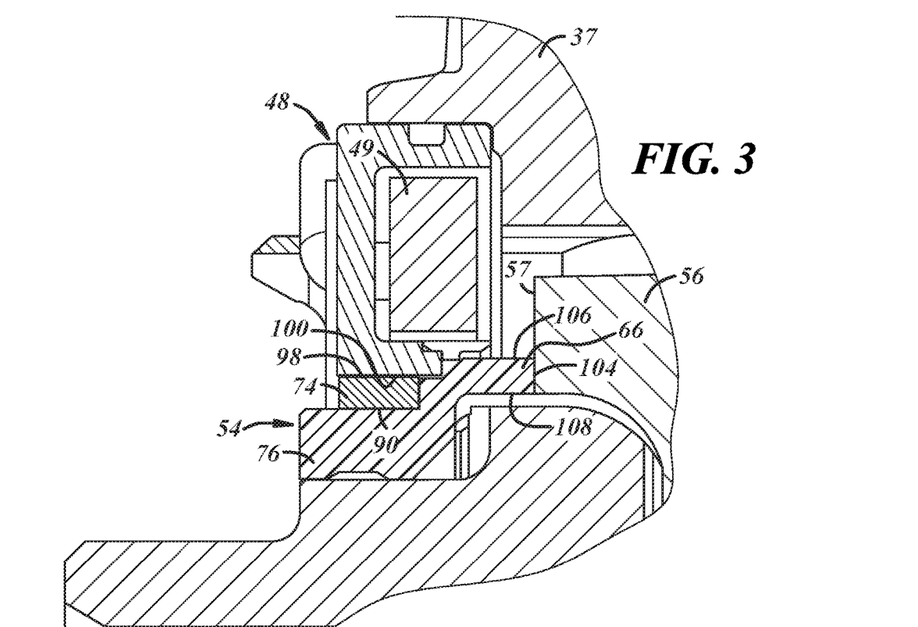
FIG. 3 is a fragmentary cross-sectional view of a portion of the differential, illustrating the locking mechanism.
Figure 4:
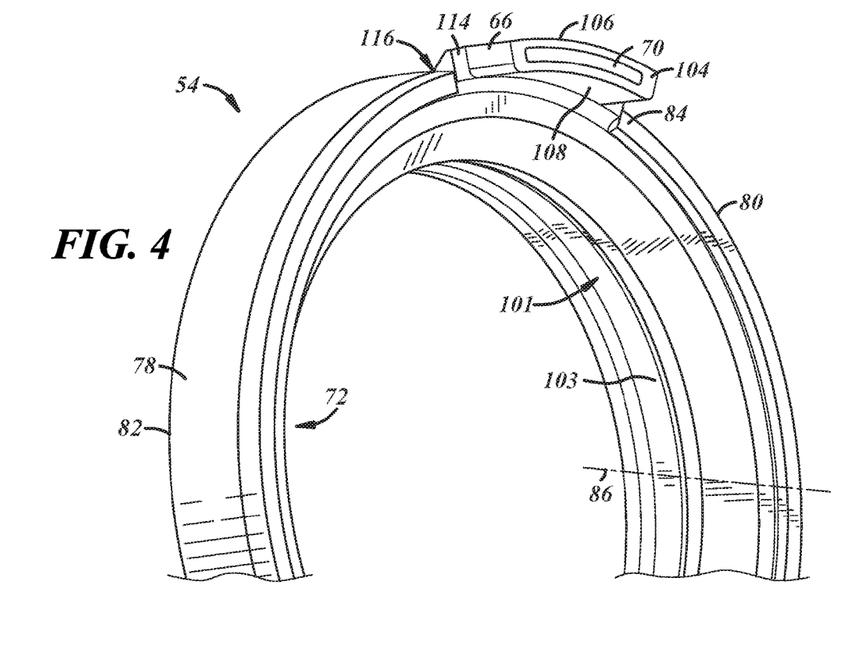
FIG. 4 is a fragmentary perspective view of a plunger of the locking mechanism.

The differential 29 illustrated in FIGS. 2 and 3 is shown in an open mode or position (FIG. 2). In the illustrated implementation, in the open position of the differential, the coil 49 is not powered, the plunger 54 is in its first position and the lock member 56 is not engaged with the side gear 36 so that the side gear can rotate relative to the lock member 56 and housing 37. In the open position, the side shafts 30, 32 may rotate at different speeds from one another. However, certain driving conditions may make it desirable for the side shafts 30, 32 to rotate in unison such that torque is applied to the wheel for which it is most useful.

In the locked position, the coil 49 is powered, the plunger 54 is advanced to its second position which drives the lock member 56 into engagement with the side gear 36 (i.e. teeth 58 engage teeth 60). Hence, the side gear 36 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

Actuation of the locking mechanism 46 may not guarantee that the lock member 56 properly engages and couples with the side gear 36. For example, the axial ends of the teeth 58, 60 may align and, at least temporarily, face-to-face meshing of the teeth 58, 60 may be prevented. In other words, the teeth 58, 60 may at times be positioned such that activation of the locking mechanism 46 does not properly engage the lock member 56 and side gear 36. Additionally, the teeth 58, 60 may skip or otherwise fail to engage even though the locking mechanism 46 is activated.

Deactivation of the locking mechanism 46 similarly may not guarantee the disengagement of the lock member 56 from the side gear 36. In other words, when the activation signal is removed from the locking mechanism 46 pressure or forces on the meshed teeth 58, 60 may prevent the lock member 56 from immediately disengaging from the side gear 36, and thus, the differential 29 may remain in the locked position for at least some time after the coil 49 is not powered. If the plunger 54 separates from the lock member 56 in such a situation, attempts to determine whether the differential 29 is locked or unlocked by monitoring the position of the plunger 54 will not be effective because the position of the plunger would not represent the position of the lock member 56.

Accordingly, the plunger 54 and lock member 56 may be coupled together so that they move axially together, as a unit. In at least some implementations, such as the one shown in FIGS. 3-8, one or both of the plunger 54 and lock member 56 include magnets 70 that provide a force holding the plunger and lock member together. In the example shown, the magnets 70 are carried by the plunger 54, in the feet 66 of the plunger. Whereas an annular body 72 (FIGS. 4-7) of the plunger 54 is received at least partially within the axial width or envelope of the coil 49, the feet 66 may extend at least partially beyond the coil envelope (where the coil 49 is generally cylindrical, the envelope may include the axial length of the interior of the cylinder). And in at least some implementations, the magnets 70 may be carried by the feet 66 so that the magnets are outside of the coil envelope whether the plunger 54 is in its first or second position. The magnets 70 may be otherwise carried by the plunger 54 (body 72 and/or feet 66), magnets may be carried instead or also by the lock member 56 and in the feet 68 of the lock member (if provided) or otherwise, as desired. Instead of using magnets, other coupling arrangements may be used. For example, the plunger 54 and lock member 56 may be mechanically coupled such as by overlapped fingers or hooks, or otherwise.

As shown in FIGS. 2-8, the plunger 54 may be formed from multiple materials include a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced. In the example set forth herein, the plunger 54 needs to move between the advanced and retracted positions with sufficient force and speed to permit effective operation of the locking mechanism 46. Thus, while all materials may be affected in some way by a magnetic field, especially a field of great strength or magnitude, not all materials are magnetically responsive as that term is used in this disclosure.

For example, iron, nickel and cobalt are often cited as being magnetically responsive as they are relatively strongly affected by magnetic fields. While not limited to steel, one material of the plunger 54 may include various grades of steel which are known to be ferromagnetic and relatively strongly magnetically responsive. Conversely, materials like wood, plastic and glass are often cited as being not magnetically responsive as they are very weakly affected/attracted by magnetic fields. Of course, magnetically responsive materials may be combined with materials that are not magnetically responsive to create a component that is magnetically responsive (e.g. by mixing magnetic materials into a polymeric material).

In at least some implementations, the plunger 54 includes a first body 74 and a second body 76 that are coupled together by one or more attachment features, or by opposed and overlapped surfaces that inhibit or prevent separation of the first body and second body, or both. Non-limiting examples of attachment features include mated projections and voids, where the projections may include flanges, tabs, fingers, tongues and the like, and the voids may include slots, holes, areas adjacent to undercut portions of a body and the like. In at least some implementations, the first body 74 and second body 76 are integrally coupled together so that they move as a single component and are not separated during use. Further, in at least some implementations, the first body 74 and second body 76 may be arranged so that they are not separated without destruction (e.g. cutting or breaking) of a portion of at least one of the bodies.

Figure 5:
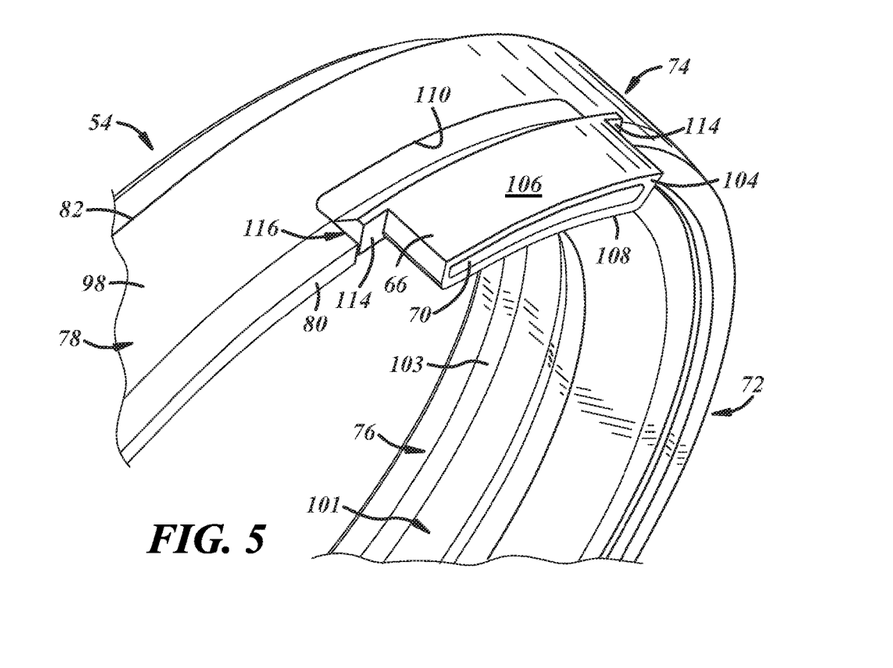
FIG. 5 is a fragmentary perspective view of the plunger.
Figure 6:
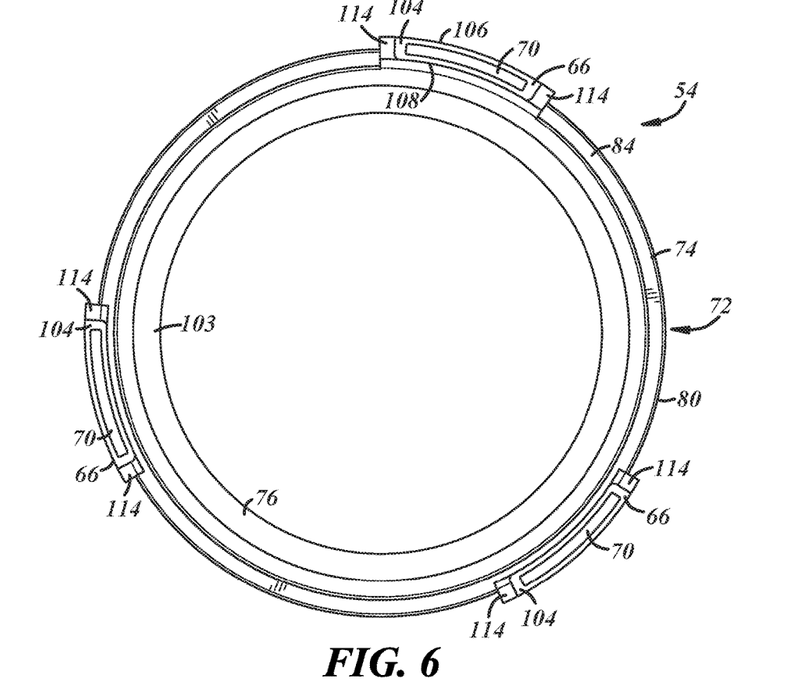
FIG. 6 is a rear view of the plunger.
Figure 7:
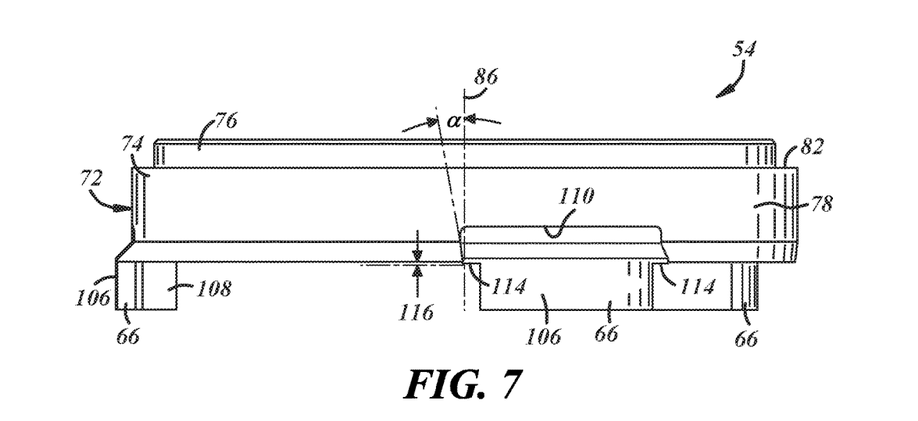
FIG. 7 is a side view of the plunger.
Figure 8:
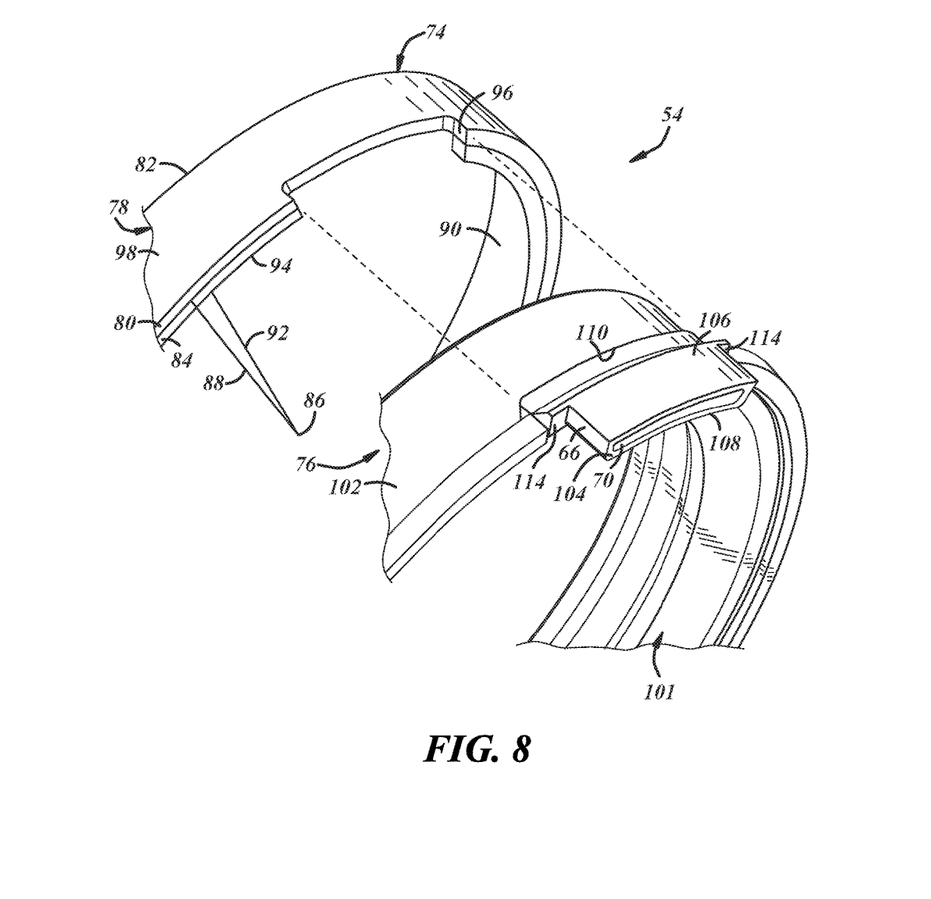
FIG. 8 is an exploded view of the plunger.

In the example shown, the first body 74 is annular and formed of a ferromagnetic metal and the second body 76 is annular and formed of a non-ferromagnetic material which may include a polymeric or composite material. As shown, the first body 74 includes a generally cylindrical sidewall 78 that leads to opposed faces 80, 82. One or both of the opposed faces 80, 82 may include a radially inwardly extending projection, hereinafter called a rim 84. In the example shown, one face 80 includes a rim 84. The rim 84 may extend along all or only a portion of the circumference of the first body 74, can be circumferentially continuous or discontinuous in one or more segments. The terms radial, axial and circumferential are relative to a central axis 86 of the first body 74. In that regard, as shown in FIG. 8, a radius 88 extending to an inner surface 90 of at least a portion of the sidewall 78 may be greater in length than a radius 92 drawn to at least a portion of the rim 84. In the example shown, an inner surface 94 of the rim 84 defines the smallest inside diameter of the first body 74, and the inner surface 90 of the sidewall 78 defines a larger, and in this implementation the largest, inside diameter of the first body 74. One or more slots 96 or other openings may be formed in or through the sidewall 78. One or more of the slots 96 may be open to one face 80 or 82 of the first body 74, if desired and as shown in FIGS. 5, 7 and 8, or the slot could comprise a hole that is fully bounded by the first body 74, if desired. An outer surface 98 of the sidewall 78 may be circumferentially continuous, if desired, and may be arranged for receipt adjacent to a radially inwardly facing surface 100 (FIG. 3) of the solenoid 48.

The second body 76 may be received at least partially within the first body 74. In the implementation shown, the second body 76 has a sidewall 101 at least a portion with an inside diameter that is less than the inside diameter of the sidewall 78 and an outer surface 102 (FIG. 8) of at least a portion of the second body 76 is received against the inner surface 90 of the sidewall 78 of the first body 74. An inner surface 103 of sidewall 101 is sized for receipt around an extension of the housing 37 and may be contoured or configured in any desired manner. At least a portion of the outer surface 102 defines an outer diameter (or radius) that is less than the inner diameter (or radius) of the sidewall 78 of the first body 74 and greater than the inner diameter (or radius) of the rim 84. In other words, at least a portion of the second body 76 is radially overlapped by the rim 84 so that the rim provides a stop surface preventing removal of the second body 76 from within the first body 74 in the direction of the rim 84. Hence, the rim 84 provides an axial stop against movement of the second body 76 relative to the first body 74 in one direction. In an example wherein the first body 74 includes a rim 84 at each face 80, 82 or end of its sidewall 78, a portion of the second body 76 may be trapped between the opposed rims to inhibit or prevent axial movement of the second body 76 relative to the first body 74 in either direction. Even without opposed rims, axial movement of the second body 76 relative to the first body 74 may be inhibited or prevented by other structures, including but not limited to a tab hook, taper angle α (FIG. 7) or other projection of the first body received in or surrounded on opposed sides by the material of the second body, or by a portion of the second body that extends into or through the slots in the first body sidewall.

Figure 9:
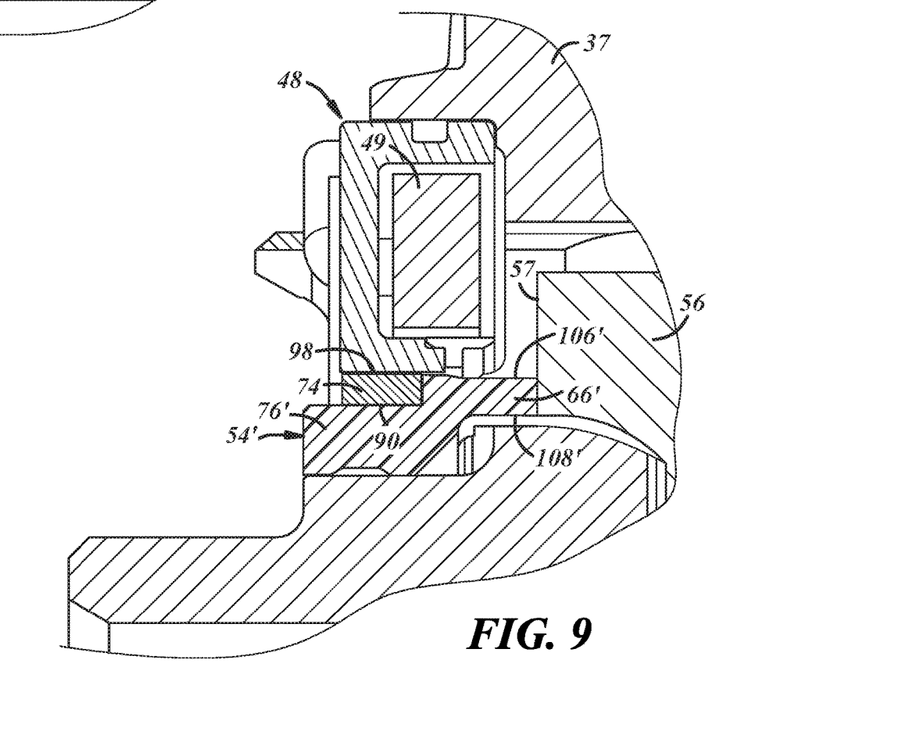
FIG. 9 is a fragmentary cross-sectional view of a portion of the differential, illustrating a locking mechanism with a modified plunger.

In the implementation shown, the second body 76 defines the feet 66 that have an end 104 located axially spaced from the first body 74. As shown, the feet 66 extend axially away from the rim 84 and the plunger 54 is oriented in assembly so that the feet 66 extend toward the lock member 56. The feet 66 could instead be arranged extending away from the other side face of the first body 74 (and the first body then flipped over). The feet 66 may extend radially outwardly relative to the first body sidewall 78 so that a radially outer surface 106 of the feet 66 is at a greater radial distance from the axis 86 than is the outer surface 98 of the sidewall 78. In the example shown, at least half of the radial dimension of the feet 66 is located at a distance greater than the outer diameter of the first body sidewall 78. And in the implementation shown, an inner surface 108 of one or more and up to all of the feet 66 is located at a radial distance greater than the smallest inner diameter of the first body 74. The plunger 54' shown in FIG. 9, has a second body 76' with feet 66' having an outer surface 106' that is at a radial distance substantially equal to the radial distance of the outer surface 98 of the first body sidewall 78. An inner surface 108' of feet 66' may be at a radial distance substantially equal to the radial distance of the inner surface 90 of the first body sidewall 78. In this instance, substantially equal includes equal and within 20% of equal, plus or minus. The plunger 54' may be otherwise similar to or the same as plunger 54.

As shown, the feet 66 may extend into and/or through the slots 96 in the first body sidewall 78 so that at least a portion of the feet 66 are located radially outwardly of the outer surface 98 of the sidewall 78. With the feet 66 extending into or through the slots 96, a portion of the second body 76 radially overlaps and engages an axially facing stop surface 110 that defines part of the slot 96. This inhibits or prevents relative axial movement of the second body 76 relative to the first body 74 in the direction of the stop surface 110. Hence, axial movement of the second body 76 relative to the first body 74 in either direction is inhibited or prevented by engagement of portions of the bodies (e.g. axially opposed stop surfaces of both the first body and second body) to prevent removal of the second body 76 from the first body 74. In at least some implementations, the first body 74 and second body 76 may be tightly held together such that no relative axial movement is permitted.

To facilitate manufacture and assembly of the plunger 54, the plunger may be formed by an overmolding or insert molding process in which the second body 76 is molded into and/or onto the first body 74. The first body 74 may be fully formed as desired and then inserted into a mold. The second body 76 may then be formed by a suitable molding process (such as but not limited to injection molding) with desired mating or overlapping features provided to couple together the components or at least inhibit removal of the second body 76 from the first body 74 after the plunger 54 is formed. Molding the second body 76 facilitates formation of the radially outwardly and axially extended feet 66 compared to plungers in which the plunger is formed from only metal.

When the plunger is all metal it is typically machined, for example on a lathe, and the geometry of the plunger and the feet are limited by the lathe process and the outer diameter of the feet are not greater than the outer diameter of the plunger sidewall. If the plunger is formed from two metal pieces, the plunger feet on the inner piece must have an outer diameter less than the outer diameter of the outer piece. The smaller inner diameters of the feet require a smaller outer diameter of the adjacent differential housing trunnion to which a shaft is coupled, which can be a weak point in the differential housing. Therefore, the ability to radially outwardly locate the feet 66 as in plunger 54 enables the adjacent portion of the differential housing 37 to be thicker and stronger and also a trunnion radius R (FIG. 3) to be larger. This significantly increases the strength of the differential housing 37 and increases the useful life of the differential. Further, if the plunger is formed from two metal pieces they must be coupled together such as by press-fitting, welding and/or staking which can be labor intensive, time consuming and costly processes.

Still further, the second body 76 may include at least one stop surface 114 that may engage part of the differential housing 37 when the plunger 54 is moved to its advanced position. The stop surface 114, in at least some implementations, may extend axially beyond the adjacent face 80 of the first body 74, as shown in FIG. 7, so that this surface 114 engages the differential housing 37 and the face 80 of the first body does not. This provides a gap 116 (also shown in FIG. 7) between the housing 37 and the first body 74. Multiple stop surfaces 114 may be provided circumferentially spaced apart, as desired. In the example shown, a stop surface 114 is provided on either side of each foot 66, although other arrangements may be used. Further, the gap 116 may be otherwise provided.

In at least some implementations, the gap 116 provides an air space between the differential housing 37 and the face 80 of the first body 74 even when the plunger 54 is fully advanced (e.g. by the axial extent to which the stop surface 114 extends beyond the face 80). Doing so can prevent a continuous or completely closed magnetic circuit from forming between the first body 76 and the differential housing 37. Such a closed circuit may tend to hold the position of the first body 74 (and hence, the plunger 54) relative to the housing 37 even when the plunger 54 is supposed to move toward its retracted position. With the air gap 116 and because the magnetic circuit is not fully closed, the plunger 54 more readily moves from its advanced position toward its retracted position when it is desired to unlock the locking member 56. Other arrangements may be used.

With a plunger that is fully metallic, the gap must be formed by a well-controlled milling process, which can be difficult. Further, when the two metallic bodies are assembled, care must be taken to ensure that the gap remains during processes such as press-fitting, welding and/or staking, and controlling the part locations and ensuring the gap remains can also can difficult. These difficulties increase the cost to manufacture and assemble a plunger formed from two non-molded bodies. In the examples described above, when the second body 76 is molded to the first body 74, the gap or gaps may be provided relatively easily during the molding process, which includes both manufacture and assembly of the two bodies. Hence, in this way, the gaps 116 are easily formed and reliably maintained in the plunger 54.

A locking mechanism 46 for a vehicle differential assembly may include a lock element 56 movable in response to an actuation signal between an unlocked position and a locked position. The lock element 56 may be configured to permit side gears 34, 36 of the differential assembly 29 to turn at varying rates relative to one another when the lock element is in the unlocked position, which corresponds to an open position of the differential 29. The lock element 56 also generally forces the side gears 34, 36 to turn generally at a same rate when the lock element is in the locked position, which corresponds to the locked position of the differential 29. In at least some implementations, the locking mechanism 46 include a wire coil 49, a plunger 54 driven by a magnetic field generated by the coil, and a lock member 56 engaged and driven by the plunger. The lock member 56 interfaces with a gear 36 of the differential 29 to change the status of the differential between open and locked positions, as set forth above. The plunger 54 may be formed from two different materials with a first body 74 formed from a first material and a second body 76 formed from a second material. The first material may be magnetically responsive and the second material may be moldable so that an integral plunger can be formed by molding the second body to the first body. As used herein, the term integral means that the plunger 54 may be handled and assembled as if it were formed from a single, homogenous material as compared to two or more separate components, and the bodies in at least some implementations are interconnected and held together without use of adhesives, fasteners, welds or the like.

It is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. In the preceding description, various operating parameters and components are described for one or more exemplary embodiments. These specific parameters and components are included as examples and are not meant to be limiting.

Reference in the preceding description to "one example," "an example," "one embodiment," "an embodiment", "an implementation" or "at least some implementations" means that a particular feature, structure, or characteristic described in connection with the example is included in at least one example or implementation including one or more but not necessarily all innovative features or components. References to various examples, embodiments or implementations do not necessarily refer to the same example, embodiment or implementation each time it appears.

The invention claimed is:

1. A system for a vehicle differential that has multiple gears, the system comprising:
   a coil;
   a drive member movable in response to a magnetic field generated by application of electricity to the coil, the drive member being movable between a first position and a second position, the drive member having an axis and including a first body formed at least partially from a first material that is magnetically responsive and a second body formed at least partially from a second material, the first body and second body are coupled together and overlapped in two opposing axial directions to limit or prevent relative axial movement between the first body and the second body; and
   a lock member driven by the drive member to engage a gear of the differential when the drive member is in the second position and the lock member is adapted to be disengaged from the gear when the drive member is in the first position.

2. The system of claim 1 wherein the first material is a metal and the second body includes a polymer.

3. The system of claim 1 wherein the second material is a material capable of being formed by a molding process.

4. The system of claim 1 wherein the first body includes oppositely facing stop surfaces and the second body includes oppositely facing stop surfaces that are adjacent to the stop surfaces of the first body to limit or prevent relative axial movement between the first body and the second body.

5. The system of claim 1 wherein the first body and second body are coupled together by one or more attachment features.

6. The system of claim 5 wherein the one or more attachment features include at least one void and at least one projection.

7. The system of claim 1 wherein the drive member has at least one axially extending foot, wherein the at least one foot has an inside surface at a radial distance that is greater than a radial distance to an inside surface of at least one of the first body or the second body.

8. The system of claim 7 wherein the at least one foot is a carried by the second body and the inside surface of the at least one foot is at a radial distance that is greater than the radial distance to an inside surface of the first body.

9. The system of claim 8 wherein the at least one foot comprises multiple feet, wherein each foot is carried by the second body and the inside surface of each foot is at a radial distance that is greater than the radial distance to an inside surface of the first body.

10. The system of claim 7 wherein the first body includes an annular sidewall having an outer surface at a first radial distance from the axis and the at least one foot extends radially outwardly relative to the first body sidewall so that a radially outer surface of the foot is at a greater radial distance from the axis than is the outer surface of the sidewall.

11. The system of claim 10 wherein at least half of the radial dimension of the foot is located at a distance greater than the outer diameter of the first body sidewall.

12. The system of claim 1 wherein the second body includes a stop surface that extends axially beyond an adjacent surface of the first body and is arranged to engage a differential housing when the drive member is in the second position.

13. The system of claim 12 wherein the second body is formed from a polymer and is molded to the first body.

14. The system of claim 13 wherein a gap is formed between the stop surface and the adjacent surface of the first body.

15. A drive member for a vehicle differential locking mechanism that is movable in response to a magnetic field, the drive member having an axis and including a first body formed at least partially from a first material that is magnetically responsive and a second body formed at least partially from a second material, the first body and second body are coupled together by one or more attachment features, or by opposed and overlapped surfaces that inhibit separation of the first body and second body, so that the first body and second body move as a single component.

16. The drive member of claim 15 wherein the first material is a metal and the second body includes a polymer capable of being formed into the second body by a molding process.

17. The drive member of claim 15 wherein the drive member has at least one axially extending foot, wherein the at least one foot has an inside surface at a radial distance that is greater than a radial distance to an inside surface of at least one of the first body or the second body.

18. The drive member of claim 17 wherein the at least one foot is a carried by the second body and the inside surface of the at least one foot is at a radial distance that is greater than the radial distance to the inside surface of the first body.

19. The drive member of claim 17 wherein the first body includes an annular sidewall having an outer surface at a first radial distance from the axis and the at least one foot extends radially outwardly relative to the first body sidewall so that a radially outer surface of the foot is at a greater radial distance from the axis than is the outer surface of the sidewall.

20. A method of forming a drive member for a vehicle differential locking mechanism that is movable in response to a magnetic field, the method comprising:
   putting into a mold a first body formed at least partially of a magnetically responsive material;
   providing flowable material into the mold;
   allowing or causing the flowable material to harden to a solid state defining a second body integrally coupled to the first body, wherein the first body and second body are overlapped in two opposing axial directions to limit or prevent relative axial movement between the first body and the second body.

21. The method of claim 20 wherein the second body includes at least one axially extending foot, wherein the at least one foot has an inside surface at a radial distance that is greater than a radial distance to an inside surface of the first body.

* * * * *